No. 800,572. PATENTED SEPT. 26, 1905.
W. B. HAYDEN.
AUTOMATIC BACK STOP FOR MOTOR CARS.
APPLICATION FILED MAY 31, 1905.
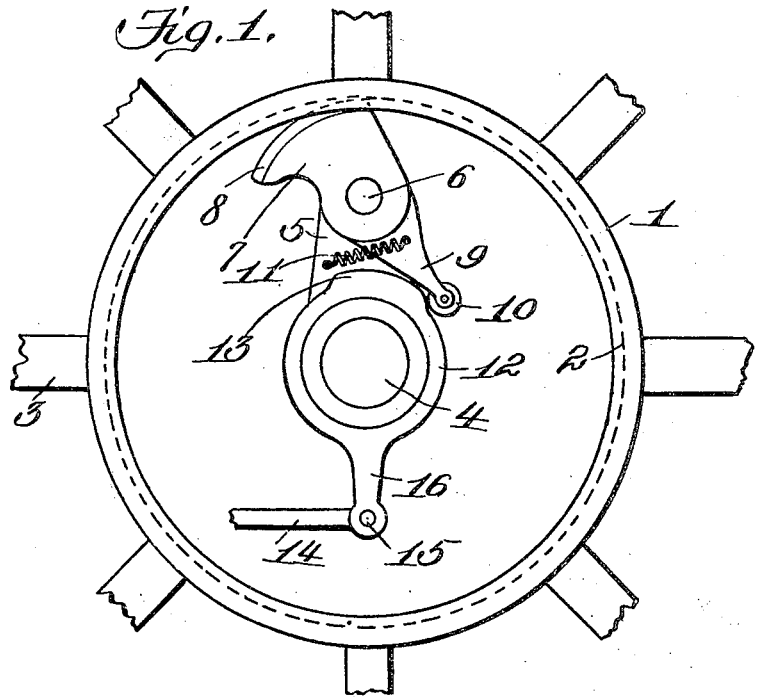
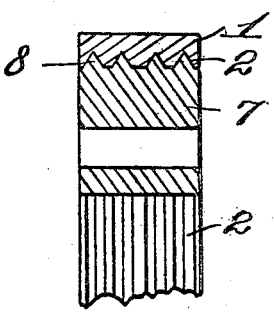
Witnesses:
Inventor
William B. Hayden

UNITED STATES PATENT OFFICE.

WILLIAM B. HAYDEN, OF NEW YORK, N. Y.

AUTOMATIC BACK-STOP FOR MOTOR-CARS.

No. 800,572. Specification of Letters Patent. Patented Sept. 26, 1905.

Application filed May 31, 1905. Serial No. 263,067.

*To all whom it may concern:*

Be it known that I, WILLIAM B. HAYDEN, a citizen of the United States, residing at New York, in the county of New York and State of New York, have invented new and useful Improvements in Automatic Back-Stops for Motor-Cars, of which the following is a specification.

This invention relates to an automatic back-stop for motor-cars, and is particularly adapted to prevent the motor-cars from backing downhill when stopped on a heavy grade without applying the hand-brakes.

The invention aims to provide an automatic back-stop for motor-cars which shall be simple in its construction, strong, durable, efficient in its use, and comparatively inexpensive to set up.

With the foregoing and other objects in view the invention consists of the novel construction, combination, and arrangement of parts hereinafter more specifically described, illustrated in the accompanying drawings, which form a part of this specification, and particularly pointed out in the claims hereunto appended.

In the drawings, Figure 1 is a side elevation of one of the wheels of a motor-car broken away and showing the automatic back-stop in position, and Fig. 2 is a sectional detail.

Referring to the drawings by reference characters, 1 denotes a continuous band having its inner face provided with a series of annular grooves 2, which are substantially V-shaped and suitably spaced apart. The band 1 is fixedly secured to the spokes 3 of the wheel.

The reference character 4 denotes the stationary axle of a vehicle and to which is fixed a support 5, carrying a short shaft 6, upon which is eccentrically mounted a toggle 7, having its upper end provided with a series of teeth 8, corresponding in contour to the grooves 2, and the said teeth 8 are adapted to engage and bite in the grooves 2, so as to arrest back movement of the vehicle-wheel, thereby preventing the vehicle from backing downhill when stopped on a heavy grade. The toggle 7 is provided with a protuberance 9, carrying a roller 10, and the said toggle 7 is connected with the support 5 through the medium of a spring 11, said spring connected at one end to the protuberance 9 and at its other end to the support 5. The action of the spring 11 is to normally retain the toggle in engagement with the band. The position of the toggle with respect to the band 1 is such that when the wheel rotates in what may be termed a "forward" direction the toggle will not arrest such movement in any manner; but if the wheel attempts to move in a reverse direction the toggle will prevent the movement thereof. This is evident, owing to the eccentric mounting of the toggle and owing also to the action of the spring 11.

Loosely mounted upon the axle 4 is a collar 12, provided with a cam-surface 13, which is adapted to engage the roller 10 for moving the toggle 7 out of engagement with the band 1 when occasion so requires. The collar 12 is moved through the action of a rod 14, which is pivotally connected, as at 15, to a depending lug 16, formed on the collar. The rod 14 is arranged in such position that it can be shifted by the operator of the vehicle.

It will be evident from the foregoing construction if a vehicle is going upgrade and is stopped thereon the vehicle will be automatically prevented from backing downhill, owing to the fact that the toggle 7 will engage the band 1 and arrest the movement of the wheel. If, however, it be desirable to back at any time, the collar 12 is shifted through the medium of the rod 14, which causes the cam-surface 13 to engage the roller 10 and shift the toggle 7 from its engagement with the band 1.

In lieu of connecting the support 5 to the stationary axle of the vehicle, the same can be secured to a casing inclosing a revoluble axle, and if the casing is employed it will be evident that the collar 12 is mounted thereon. It is thought unnecessary to illustrate the foregoing structure.

I am well aware that ratchets and pawls have been and are being used for the purpose of back-stops; but they are unusually noisy while in service and when a stop is suddenly made there is lost motion, causing undue and heavy strain on the machinery. One of the advantages of the construction of back-stop in accordance with this invention is to obviate the foregoing difficulties and obtain a noiseless instantaneous back-stop without concussion or strain on the machinery.

Having thus fully described my invention, what I claim as new, and desire to secure by Letters Patent, is—

1. An automatic back-stop for vehicles, comprising a band having one inner face provided with a plurality of grooves, a stationary support, an eccentrically-mounted toggle on said support, provided with a plurality of teeth corresponding to the grooves in said band, a spring connection between the toggle and the support for retaining the toggle against the band, and means for shifting the toggle from its engagement with the band.

2. The combination with a vehicle-wheel and a stationary axle therefor, of a support fixed to said axle, a band fixed to the wheel and having its inner face provided with an annular groove, an eccentrically-mounted toggle on said support having a tooth adapted to engage in said groove and further provided with a protuberance carrying a roller, a spring connection between said toggle and said support for retaining the toggle in said groove, and means mounted upon the axle and adapted to engage the roller for shifting the toggle out of engagement with said band.

3. The combination with a vehicle-wheel and a stationary axle therefor, of a support fixed to said axle, a band fixed to the wheel and having its inner face provided with an annular groove, an eccentrically-mounted toggle on said support having a tooth adapted to engage in said groove and further provided with a protuberance carrying a roller, a spring connection between said toggle and said support for retaining the toggle in said groove, a collar mounted upon the axle and provided with a cam-surface adapted to engage said roller for shifting the toggle out of engagement with the band, and means for operating the collar.

4. The combination with a vehicle-wheel and a stationary axle, of a band fixed to the wheel and having its inner face provided with an annular groove, and a spring-actuated and eccentrically-mounted toggle supported upon the axle and provided with a tooth corresponding to said groove and adapted to engage in the groove to automatically prevent back rotation of the wheel.

5. The combination with a vehicle-wheel and a stationary axle, of a band fixed to the wheel and having its inner face provided with an annular groove, a spring-actuated and eccentrically-mounted toggle supported upon the axle and provided with a tooth corresponding to said groove and adapted to engage in the groove to automatically prevent back rotation of the wheel, and means suspended upon the axle and adapted when operated to engage the toggle to move the latter out of engagement with the band.

In testimony whereof I have hereunto set my hand in presence of two subscribing witnesses.

WILLIAM B. HAYDEN.

Witnesses:
MATILDA L. HAYDEN,
OLIVER H. PERRY.